US006924729B1

(12) United States Patent
Aschauer et al.

(10) Patent No.: US 6,924,729 B1
(45) Date of Patent: Aug. 2, 2005

(54) REMOTE CONTROL DEVICE FOR MOTOR VEHICLES

(75) Inventors: Paul Aschauer, Emmering (DE); Michael Koblbauer, Altdorf-Pfettrach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/701,241

(22) PCT Filed: Apr. 29, 1999

(86) PCT No.: PCT/EP99/02917

§ 371 (c)(1),
(2), (4) Date: Feb. 12, 2001

(87) PCT Pub. No.: WO99/61731

PCT Pub. Date: Dec. 2, 1999

(30) Foreign Application Priority Data

May 27, 1998 (DE) ........................................ 198 23 731

(51) Int. Cl.[7] ................................................ G05B 19/00

(52) U.S. Cl. .................... 340/5.53; 340/5.64; 340/5.52; 340/5.72; 340/5.8; 340/5.81; 340/5.82; 340/5.83; 340/5.84; 340/825.69; 307/10.1; 307/10.2

(58) Field of Search ............................... 340/5.53, 5.64, 340/5.52, 5.72, 5.8, 5.81, 5.82, 5.83, 5.84, 825.69; 307/10.1, 10.2; 704/273; 713/200–202

(56) References Cited

U.S. PATENT DOCUMENTS 5,513,107 A * 4/1996 Gormley ...................... 701/48
5,704,008 A * 12/1997 Duvall, Jr. .................. 704/273
6,140,939 A * 10/2000 Flick ..................... 340/825.69

FOREIGN PATENT DOCUMENTS

| | | |
|---|---|---|
| DE | 43 31 300 | 3/1995 |
| DE | 44 24 735 | 2/1996 |
| DE | 195 11 386 | 5/1996 |
| DE | 196 18 144 | 4/1997 |
| DE | 197 13 607 | 10/1998 |
| EP | 0 805 247 | 11/1997 |
| EP | 0 926 305 | 6/1999 |
| JP | 2-282587 | 11/1990 |
| JP | 5-311935 | 11/1993 |
| JP | 8-218709 | 8/1996 |

* cited by examiner

*Primary Examiner*—Ario Etienne
*Assistant Examiner*—Yves Dalencourt
(74) *Attorney, Agent, or Firm*—Crowell & Moring LLP

(57) ABSTRACT

A remote control device for motor vehicles having a transmitter for wireless transmission activated only when the user has been recognized as the authorized user. An identification device recognizes the authorization and is assembled with the transmitter in a single module. The identification device records personal and individual characteristics of the user and transmits the recorded information to the vehicle, as well as performs the verification check of the within the vehicle.

5 Claims, 2 Drawing Sheets

REMOTE CONTROL DEVICE FOR MOTOR VEHICLES

BACKGROUND AND SUMMARY OF THE INVENTION

This application claims the priority of German Patent Document, filed May 27, 1998 and PCT International No. PCT/EP99/02917, the disclosures of which are expressly incorporated by reference herein.

The invention relates to a remote control device for motor vehicles. Such a remote control device is known from the non-prepublished German patent application 197 13 607 in so far as there the enabling signal cannot be triggered until the user has been recognized as an authorized user. Within the scope of the present invention the alternative embodiment is also conceivable, wherein the enabling signal is transmitted, to be sure, but it does not become activated until the user has been recognized as an authorized user. Thus, it is not a matter for the transmission but rather the actuation of the enabling signal whether the user is the authorized user. Furthermore, within the scope of the present invention the earlier invention is only relevant in so far as now the focus is especially on the application in a motor vehicle.

The invention is based on the problem of providing a remote control device of the class described in the introductory part, with which the goal is reached that there is an effective guarantee against unauthorized use, for example in cases where the transmitter and thus the identification device have fallen into the hands of an unauthorized user.

The identification device now recognizes the personal, individual biometric characteristics of the user. Thus, the case, where the identification is done with a key for an access control device, is ruled out. Only the authorized user exhibits the individual characteristics. Only he is in a position to trigger the desired functions using the enabling signal. In this respect it involves primarily the opening of a vehicle, but also the closing of said vehicle or the starting of the drive motor and also within the scope of personalization the possibility of adjusting accessory components of the vehicle, like seats, the air conditioning system and the like in accordance with the personal needs of the respective user.

The identification device can be designed in different ways. One possibility uses a voice recognition module that, like the known access control devices, recognizes the individual vocal characteristics of the respective user.

As an alternative, it is also possible to scan a fingerprint of the authorized user using the identification device. In this case it can be a conventional sensor, which, on the basis of image recognition, records a static image of the fingerprint and compares with the corresponding information of the authorized user. As an alternative, however, it can also be a sensor, where the fingerprint or the individual features of the fingerprint are recorded by a sweeping movement of the finger over a stationary sensor.

The verification of the user can be done in different ways. It can be done, for example, in the module, formed by sensor and identification device. This module can also be connected to a conventional mechanical key. This possibility of verification offers the advantage that the enabling signal may or may not be transmitted to the vehicle. Thus, in particular safety from interception is achieved for the enabling signal.

As an alternative, the verification of the user can also be done in the vehicle. Then the enabling signal and the information obtained by means of the identification device can be transmitted to the vehicle; and then, only when this information is that of the authorized user, are the corresponding functions of the vehicle triggered by means of the enabling signal.

The latter offers additionally the possibility of enabling several authorized persons to use the vehicle. To this end, the information of an authorized person is first transmitted. If then, for example, within a timespan of one minute, the information is transmitted in the form of biometric data of a new user, said new user will also be considered in the future as the authorized user. The prerequisite is that this information, just like the information of the first authorized user, be stored in the vehicle and kept on hand for a comparison with information that is subsequently transmitted.

Thus, it is possible, for example, to put the attendant at a hotel or on a parking lot in the position of using the vehicle by himself. Simultaneously it is guaranteed that the use of an unauthorized person is ruled out. It is also possible to limit the usage possibilities for the user, provided with authorization in this manner. Thus, for example, it can be logical to provide this person with only the use of the vehicle at a maximum speed of 20 km/h. This measure offers the advantage that, if the new user has obtained his authorization through force of the first user, this second user has only limited control over the motor vehicle.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
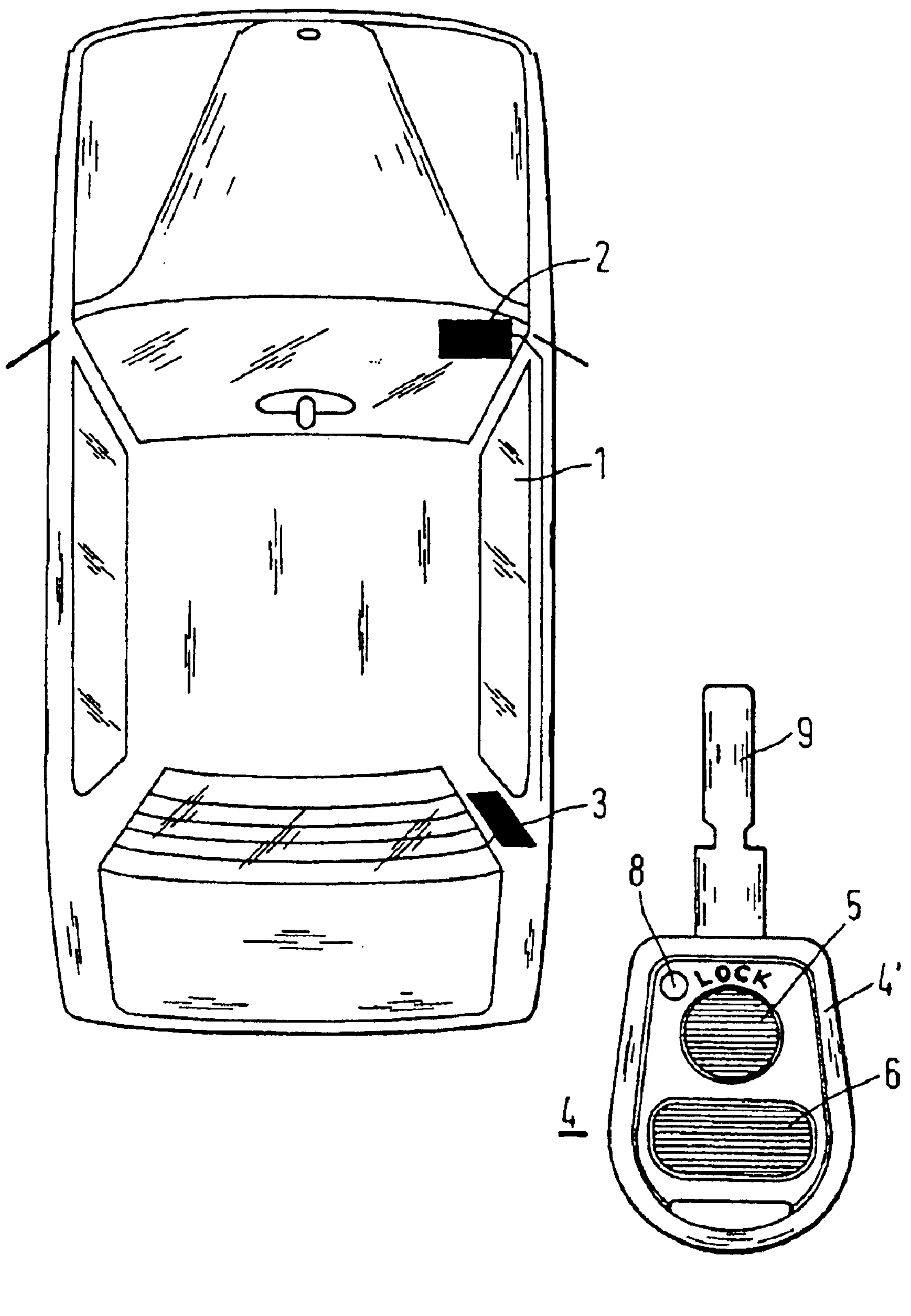
FIG. 1 is an overview of the inventive remote control device for motor vehicles and FIG. 2 is an enlargement of a detail of FIG. 1.

FIG. 1 is a top view of a remote controlled vehicle 1, which has several transponders 2, 3, which are connected to a central control device (not illustrated). The transponders 2 and 3 are a part of a remote control device, which can be controlled by a mobile transponder 4. The transponder 4 is located in today's conventional remote control key 4' and exhibits a number of contact switches, for example 5 and 6. The contact switch 5 serves to send the command "lock" or "secure" to a control device for the central locking and closing system of the vehicle (not illustrated). The contact switch 6 serves to send the command "unlock". Whereas the operating mode of the contact switch 5 corresponds to today's customary radio key, the operating mode of the contact switch 6 is designed according to the invention.

Figure 2:
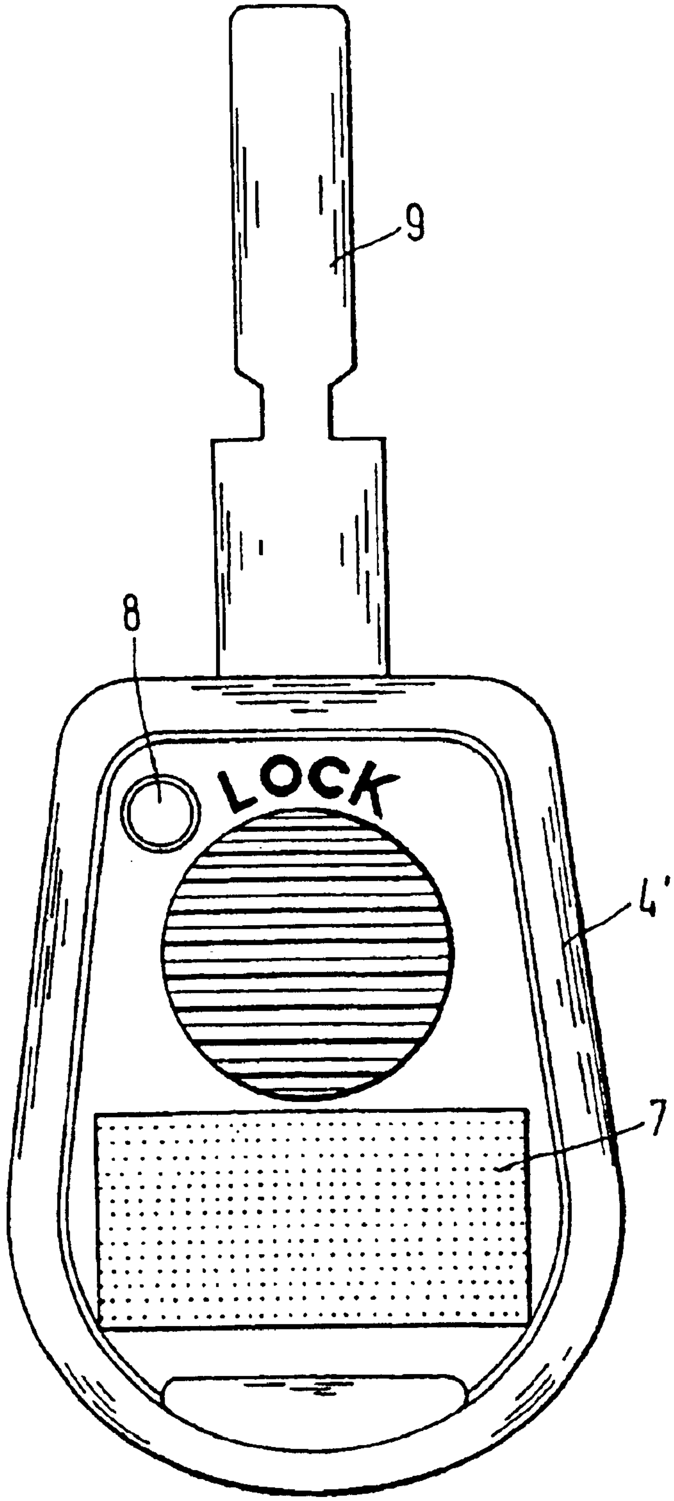

If the contact switch 6 is actuated, a sensor is simultaneously activated. Said sensor is located below the scanning element 6', which is made of a transparent material. The sensor 7 is shown in detail in FIG. 2. FIG. 2 is an enlargement of the key 4' of FIG. 1. The sensor 7 takes a picture of the user's skin furrow structure and compares this structure with a structure, deposited in a storage (not illustrated) of the key 4. The comparison is done in the well-known manner using suitable commercial devices for fingerprint identification. If this comparison shows the user to be the authorized user, a transmitter, also provided in the key 4', transmits an enabling signal to the transponders 2 and 3, which then forward this enabling signal to suitable devices, for example, for central locking or starting of the vehicle. This signal can be individually tuned, as well-known, by means of an encryption mechanism to the respective vehicle so as to be safe from interception.

Instead of the illustrated and described embodiment with the comparator, which is arranged in the key 4' and is intended for the fingerprint of the authorized user, it is also possible to design the sensor 7 in such a manner that it records only information about the respective user's skin furrow structure and transmits this information to the vehicle, where the comparator is located. Said comparator compares this information with the stored information of the authorized user(s) and optionally carries out the described enabling operations.

After identification of an authorized user, it is also possible to store the biometric data (finger furrow structure) of another user or also transmit said data to the vehicle 1. Said identification can be made visible, for example, by means of a light display 8 in the key 4. This user is then also authorized and can in the future open or start the vehicle without previous authorization by the first authorized user. The only condition is that the biometric data be recorded by the sensor 7 in the described manner and compared with the then stored data of the same user. In this manner it is possible to record the usage authorization of several users.

Instead of a sensor, which responds to the skin furrow structure, a well-known voice comparator can also be provided in the key 4' that identifies the authorized user by means of his vocal spectrum.

In this manner it is possible to give only the authorized user the option of the actual use of the vehicle with the aid of the key 4. If the key 4 is lost, the biometric data of the finder and possible unauthorized user are neither stored in the key 4' nor in the vehicle 1. Despite possession of the key, he is not in a position to use the vehicle. The storage procedure can be done in a manner that is manipulation safe in that storage is only possible if the mechanical part 9 of the key 4' is inserted into a receptacle, e.g. the ignition lock of the vehicle 1 and unlocks there a mechanical stop. In this manner effective protection against theft is achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A remote control device for motor vehicles with a transmitter for a wireless transmitted enabling signal, which is activated only when a user has been recognized as an authorized user, and with an identification device, which recognizes this authorization and is assembled in one module along with the transmitter, wherein the identification device records the personal and individual characteristics of the user, wherein the identification device transmits the recorded information to the vehicle and performs a verification check of the user in the motor vehicle; and wherein, following transmission of the information about a previously authorized user, corresponding information about a new user is transmitted for storage for later comparison, and said new user is then also able to be authorized in the future.

2. The device as claimed in claim 1, wherein the identification device records a fingerprint.

3. The device as claimed in claim 1, wherein the identification device records a vocal characteristic.

4. The device as claimed in claim 1, wherein the authorization of the new user is restricted.

5. A remote control device for motor vehicles with a transmitter for a wireless transmitted enabling signal, which is activated only when a user has been recognized as an authorized user, and with an identification device, which recognizes this authorization and is assembled in one module along with the transmitter, wherein the identification device records the personal and individual characteristics of the user, wherein the identification device transmits the recorded information to the vehicle and performs a verification check of the user in the motor vehicle; and wherein, following transmission of the information about a previously authorized user, corresponding information about a new user is transmitted, and said new user is then also authorized and, wherein, in order for the new user to be authorized, said corresponding information about the new user is transmitted within a predetermined time period following the transmission of the information about the previously authorized user.

* * * * *